United States Patent
Hu et al.

(10) Patent No.: US 6,901,085 B2
(45) Date of Patent: May 31, 2005

(54) MULTI-WAVELENGTH RING LASER SOURCE

(75) Inventors: Hanwu Hu, Ottawa (CA); Nima Ahmadvand, Ottawa (CA)

(73) Assignee: Peleton Photonic Systems Inc. (CA)

(*) Notice: Subject to any disclaimer, the term of this patent is extended or adjusted under 35 U.S.C. 154(b) by 530 days.

(21) Appl. No.: 10/029,802

(22) Filed: Dec. 31, 2001

(65) Prior Publication Data

US 2003/0123132 A1 Jul. 3, 2003

(51) Int. Cl.⁷ .............................................. H01S 3/30
(52) U.S. Cl. ........................................................ 372/6
(58) Field of Search ........................... 372/6; 359/341.1

(56) References Cited

U.S. PATENT DOCUMENTS

| | | | |
|---|---|---|---|
| 5,504,771 A | * 4/1996 | Vahala et al. | 372/94 |
| 5,857,040 A | * 1/1999 | Bigo et al. | 385/15 |
| 6,134,250 A | * 10/2000 | Koren et al. | 372/6 |
| 6,163,553 A | 12/2000 | Pfeiffer | 372/6 |
| 6,324,204 B1 | * 11/2001 | Deacon | 372/96 |
| 6,370,164 B1 | * 4/2002 | Islam | 372/6 |
| 2001/0050788 A1 | 12/2001 | Atien | 359/109 |

OTHER PUBLICATIONS

Yi et al. Gain–Clamped Erbium–doped Fiber–Ring Lasing Amplifier with Low Noise Figure by Using an Interleaver. IEEE Photonics Technology Letters. vol. 15. No. 2. Dec. 2003.*

M. Karasek and A. Bellemare, Numerical Analysis of Multifrequency Erbium–Doped Fibre Ring Laser Employing Periodic Filter and Frequency Shifter, IEEE Proceedings–Optoelectronics, Apr., 2000, vol. 147, pp. 115–119.

T. Papakyrikopoulos, et al., 10 × 10 Ghz Simultaneously Modelocked Multiwavelength Fibre Ring Laser, Electronics Letters, Apr. 29, 1999, vol. 35, No. 9, pp. 717–718.

* cited by examiner

*Primary Examiner*—Thomas H. Tarcza
*Assistant Examiner*—Deandra M. Hughes
(74) *Attorney, Agent, or Firm*—Katten Muchin Zavis Rosenman

(57) ABSTRACT

In the present invention a Multi-Wavelength Ring Laser Source (MWRLS) design based on Erbium Doped Fiber Laser is provided. A LiNbO₃ modulator is used to extend laser channels and as mode-locking device.

8 Claims, 2 Drawing Sheets

MULTI-WAVELENGTH RING LASER SOURCE

BACKGROUND OF THE INVENTION

1. Field of the Invention

Figure 1:
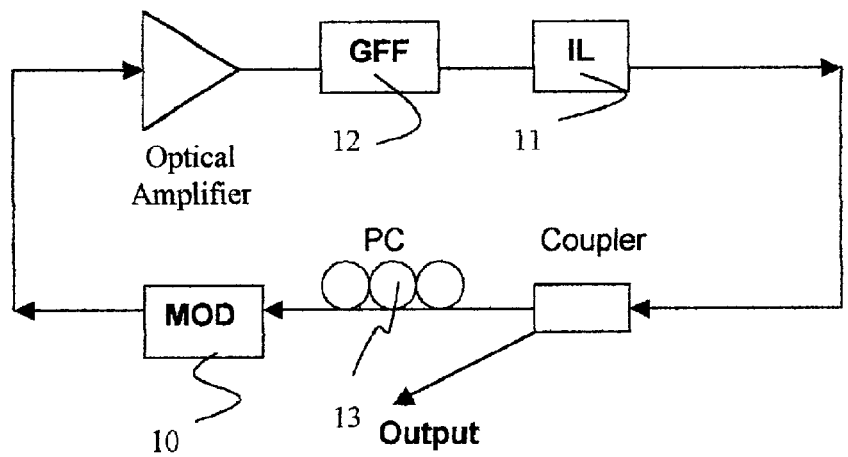

This invention relates generally to optical communication systems and more particularly to optical laser sources with multiple lasing wavelengths.

2. Prior Art of the Invention

Dense wavelength division multiplexing (DWDM) is a very important technology for fiber optical communications, since it provides a very economical and efficient way to increase the transmission capacity by exploiting the enormous bandwidth available in optical fibers. In this technology the bandwidth in the low attenuation band of the optical fiber is subdivided into a number of wavelength channels where each channel carries data up to a maximum rate which is accessible to electronic interfaces.

At the transmitter side of DWDM networks, Multi-Wavelength Laser Sources (MWLS) are required to enable parallel transmission on a large number of wavelength channels. On the other hand, MWLS are also required to test DWDM components, modules and systems. This has been one of the most troubling shortcomings in test and measurement technology, since single channel scanning methods are used to characterize such systems and components. However, a true test for a DWDM module or component must include all the channels at the same time. MWLS can provide an efficient means to perform DWDM testing.

A straightforward approach to realize MWLS is to combine the output power from an array of single wavelength lasers into a single fiber [M. G. Young, U. Koren, B. I. Miller, M. A. Newkirk, M. Chien, M. Zirngibl, C. Dragone, B. Tell, H. M. Presby, and G. Raybon, "A 16×1 wavelength division multiplexer with integrated distributed Bragg reflector lasers and electroabsorption modulators," IEEE Photon. Technol Lett., vol. 5, pp908–910, 1993].

Channel spacing regularity can be improved using multiple wavelength semiconductor lasers based on an array of physically separated gain media with lasing wavelengths determined by diffraction gratings; [M. C. Farries, A. C. Carter, G. G. Jones, and I. Bennion, "Tunable multiwavelength laser with single fiber output," Electron. Lett., vol. 27, pp1498–1499, 1991], or waveguide grating routers; [M. Zirngibl, C. H. joyner, C. R. Doerr, L. W. Stulz, and H. M. Presby, "An 18-channel multifrequency laser," IEEE Photon. Technol. Lett., vol. 8 pp870–872, 1996].

Erbium doped fiber (EDF) lasers have been attracting a lot of research and applications because of their high gain and efficient oscillation. However, it is not easy to obtain a multi-wavelength laser output from EDF lasers. In an EDF laser, all the lasing modes of the channels compete with each other. Only the laser oscillating modes with gain higher than the threshold can exist in the laser cavity and emit from the cavity. In order to realize multi-wavelength laser output from EDF lasers, the competition between laser channel modes must be reduced and the gain must be equalized for all channels. At room temperature, the homogenous line broadening of the gain spectrum is predominant. This effect must be suppressed, otherwise, the gain will be clamped by the resonator loss at only one lasing frequency and separate gain media have to be used for each wavelength channel. One method is to cool EDF lasers in liquid nitrogen (77° K) to reduce the homogenous broadening and cross-gain saturation effects in the fiber; [S. Yamashita and K. Hotate, "Multiwavelength erbium-doped fiber laser using intracavity etalon and cooled by liquid nitrogen," Electron. Lett., vol 32, pp1298–1299,1996]. The other method is to use a frequency shifter to promote multi-wavelength operation, [H. Sasamori, M. Isshiki, H. Watanabe, and K. Kasahara, "Multi-wavelength erbium-doped fiber ring light source with fiber grating filter," in Proc. Tech. Dig. Optical Amplifiers Applications (OAA '97), 1997, Paper WC3, pp235–238], [A. Bellemare, M. Rochette, M.Tetu, and S. LaRochelle, "Multifrequency erbium-doped fiber ring lasers anchored on the ITU frequency grid," in Proc. Tech. Dig. Optical Fiber Commun. Conf. (OFC'99), 1999, Paper TuB5, pp. 16–18].

The present invention provides, a novel design based on EDF ring lasers, which simultaneously provide a number of wavelength channels.

SUMMARY OF THE INVENTION

In the present invention a Multi-Wavelength Ring Laser Source (MWRLS) design based on Erbium Doped Fiber Laser is provided. A LiNbO$_3$ modulator is used to extend laser channels and as mode-locking devices. An acceptably flat laser spectrum with large number of channels lasing simultaneously has been achieved by incorporating a number of techniques, such as mode locking and mode suppression into the fiber ring laser. Optical interleavers are used to confine the lasing oscillations to the ITU grid, reduce the unneeded modes and increase the laser stability.

According to the present invention a multi-wavelength ring laser source is provided, comprising a pump laser source, an optical amplifier, an optical channel interleaver, an optical output-signal coupler, a polarization controller and an optical modulator; the components are optically interconnected as a closed ring to provide the optical output-signal as the laser source.

BRIEF DESCRIPTION OF THEE DRAWINGS

Figure 2:
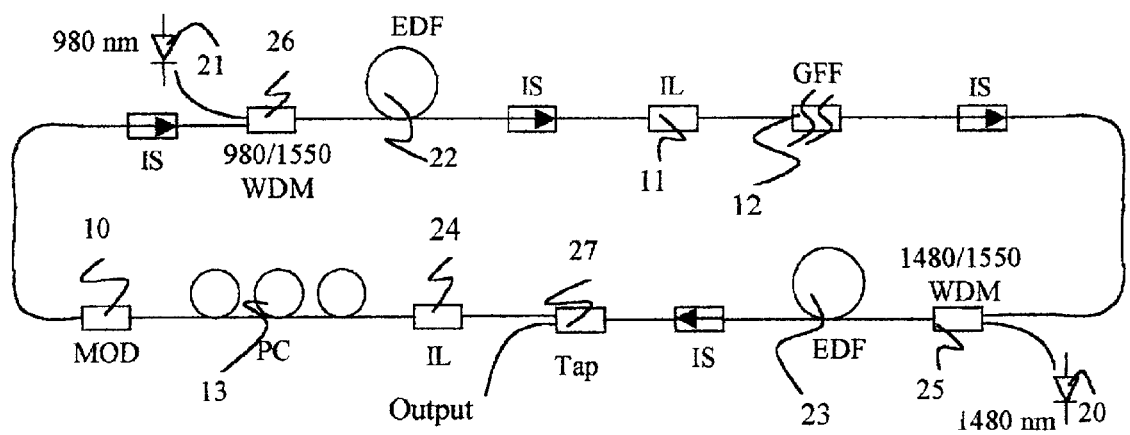
Figure 3:
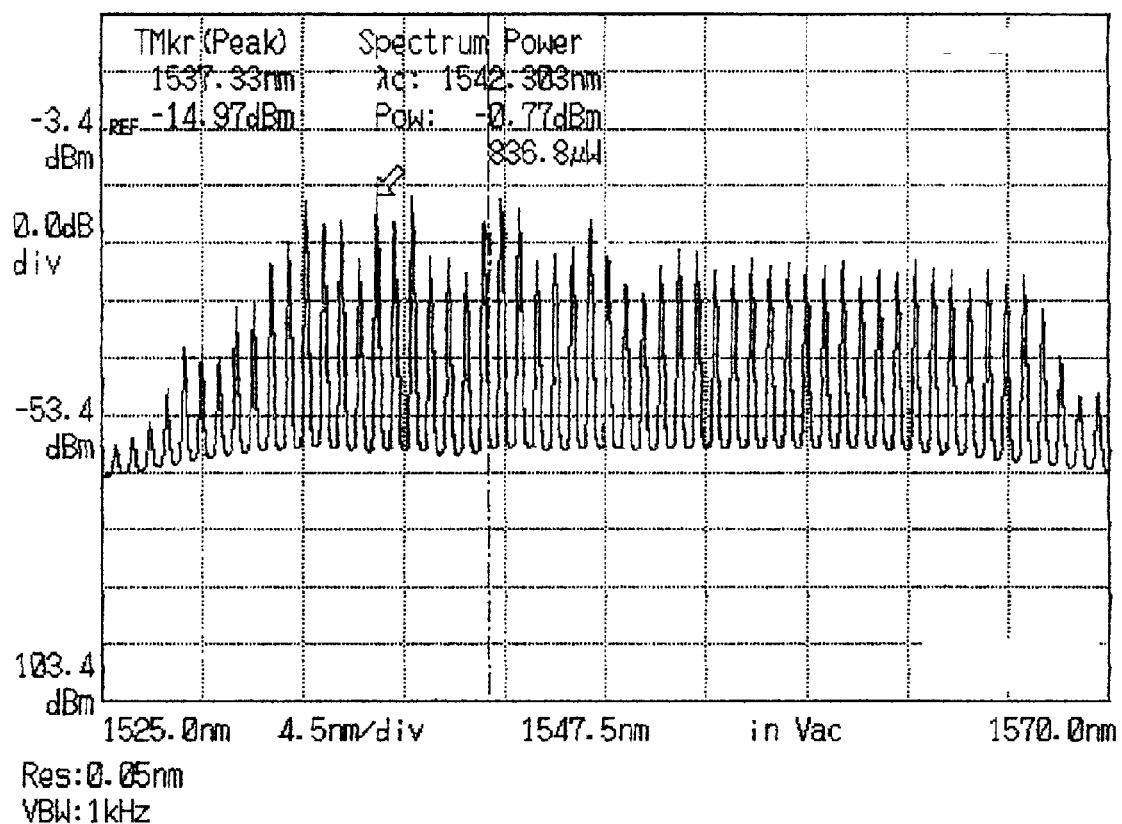

The preferred exemplary embodiments of the present invention will now be described in detail in conjunction with the annexed drawing, in which:

FIG. 1 shows the general architecture for a Multi-Wavelength Ring Laser Source (MWRLS) according to the present invention, FIG. 2 shows the architecture in more detail for an MWRLS covering more than 40 channels with channel spacing of 100 GHz in the C-Band; and FIG. 3 shows the experimental results for the MWRLS of FIG. 2.

DETAILED DESCRIPTION OF THE PREFERRED EMBODIMENTS

The Ring Laser of the present invention emits a number of wavelength channels all tuned to the ITU grid. FIG. 1 shows the general architecture of the novel Multi-Wavelength Ring Laser Source (MWLS), where mode locking, frequency shifting and mode suppression are techniques incorporated into the ring laser to provide multi-wavelength lasing.

An optical modulator 10, such as LiNbO$_3$ modulator, is used to perform frequency shifting to prevent steady state lasing and single frequency oscillation. The light power is shifted to a neighbor frequency in each round-trip, around the ring. Therefore, the output spectrum of the ring laser shown is extended. Both phase modulators and intensity modulators have the ability to extend the spectral width of lasers. The optical modulator 10 acts not only as a frequency shifter but also as a mode-locking device. Typical harmonic mode-locked fiber lasers are not stable if no additional stabilization scheme is used. This is due to the fact that there are many super-modes, which compete with each other for the maximum gain and thus make the laser unstable. In the present architecture an optical interleaver 11 is used to force the laser to lase at the ITU standard frequencies, to reduce the line width of the laser and to stabilize the output power. Only one of the usual two output ports of the optical interleaver 11 is used in the laser cavity. The other output is angularly cut to reduce reflection. A Gain Flattening Filter 12 (GFF) is used to equalize the gain profile in the whole wavelength band. This helps in resolving the competition among different channels to provide much easier multi-wavelength lasing. A Polarization Controller 13 is used to ensure uniform polarization across the band and ensure uniform modulation by the modulator 10.

FIG. 2 shows the detailed architecture for a MWRLS that provides more than 40 channels with 100 GHz channel spacing in the C-Band. Two pump lasers at 1480 nm 20 and 980 nm 21 are used. This is because the LiNbO$_3$ modulator 10 and the optical interleaver 11 impose optical losses in the ring. The 980 nm pumped EDFA 22 produces less ASE noise effects on laser oscillations than the 1480 nm pumped one 23. 1480 nm pump EDFA 23 has high power conversion efficiency and can emit higher power laser output. The two optical interleaver modules 11 and 24 are used to efficiently tune the channels to the ITU standard as well as to provide more stable lasing with sharper line width. The two pump lasers 20 and 21 are coupled into the ring via WDM couplers 25 and 26, respectively. The output of the source is coupled out via tap coupler 27. Isolators IS for the 1550 nm wavelength are used throughout to prevent backward lasing oscillation and increase forward lasing oscillation.

A LiNbO$_3$ modulator (intensity or phase) is a polarization sensitive device. As a result, the polarization controller 13 is needed in combination with the modulator 10 to realize fine gain equalization. This is very important for each channel laser mode resonance. It should be noted that the GFF 12 affects the gain profile for the whole band.

FIG. 3 shows the experimental results for the example embodiment of FIG. 2. As shown an acceptably flat laser spectrum covering more than 40 channels with a channel spacing of 100 GHz in the C-band is achieved. By improving the gain flattening filter 12, a flatter spectrum can be obtained.

What is claimed is:

1. A multi-wavelength ring laser source (MWRLS), comprising:
   a pump laser source;
   an optical amplifier;
   an optical channel interleaver;
   an optical output-signal coupler;
   a polarization controller; and
   an optical modulator;
   optically interconnected as a closed ring to provide the optical output-signal as the laser source.

2. The MWRLS as defined in claim 1, further comprising an optical gain flattening filter in the ring.

3. A multi-wavelength ring laser source (MWRLS), comprising:
   a first wave-division multiplex (WDM) coupler for coupling a first pump laser signal into the ring laser source;
   a first erbium-doped fiber (EDF) amplifier;
   a first optical channel interleaver (IL);
   a second WDM coupler for coupling a second pump laser signal into the ring laser source;
   a second EDF amplifier;
   an optical output-signal coupler for coupling out the laser source signal;
   a second IL;
   a polarization controller (PC); and
   an optical modulator; optically interconnected as a closed ring to provide output-signal as the laser source when said first and second pump lasers are activated.

4. The MWRLS of claim 3, further comprising an optical gain flattening filter (GFF) between the first optical channel interleaver and the second WDM coupler.

5. The MWRLS of claim 4, further comprising a plurality of unidirectional optical isolators between predetermined components of said MWRLS.

6. The MWRLS of claim 5, said first and second pump lasers emitting signals at different wavelengths.

7. The MWRLS of claim 6, said first pump laser emitting at a wavelength of 980 nm.

8. The MWRLS of claim 6, said second pump laser emitting at a wavelength of 1480 nm.

* * * * *